(12) United States Patent
Suwald et al.

(10) Patent No.: US 10,482,058 B2
(45) Date of Patent: Nov. 19, 2019

(54) BIOMETRIC SENSING SYSTEM AND COMMUNICATION METHOD

(71) Applicant: NXP B.V., Eindhoven (NL)

(72) Inventors: Thomas Suwald, Hamburg (DE); Arne Burghardt, Hamburg (DE); Tobias Voigt, Reinbek (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/046,809

(22) Filed: Jul. 26, 2018

(65) Prior Publication Data

US 2019/0034378 A1 Jan. 31, 2019

(30) Foreign Application Priority Data

Jul. 27, 2017 (EP) .................................... 17183469

(51) Int. Cl.
  *G06K 19/07* (2006.01)
  *G06F 13/42* (2006.01)
  *G06F 1/04* (2006.01)
  *G06F 1/3228* (2019.01)

(52) U.S. Cl.
  CPC ............ *G06F 13/4295* (2013.01); *G06F 1/04* (2013.01); *G06F 1/3228* (2013.01); *G06F 13/4291* (2013.01); *G06K 19/0718* (2013.01)

(58) Field of Classification Search
  CPC .................... G06F 13/4291; G96K 19/0718
  See application file for complete search history.

(56) References Cited

U.S. PATENT DOCUMENTS

| | | | |
|---|---|---|---|
| 9,042,274 B2 | 5/2015 | Peichl et al. | |
| 2002/0183092 A1* | 12/2002 | Suzuki | G06F 13/385 455/557 |
| 2006/0129347 A1* | 6/2006 | Gadh | G01D 21/00 702/127 |
| 2009/0228714 A1 | 9/2009 | Fiske et al. | |
| 2011/0221706 A1* | 9/2011 | McGibney | G06F 3/0428 345/175 |
| 2014/0143461 A1* | 5/2014 | Chettimada | G06F 13/4291 710/110 |

(Continued)

OTHER PUBLICATIONS

"Introduction to the MIPI I3C Standardized Sensor Interface", mipi alliance, 11 pgs., retrieved from the internet Sep. 11, 2017 at: https://cdn2.hubspot.net/hubfs/2384176/MIPI_Alliance_I3C_Whitepaper.pdf (Aug. 1, 2016).

(Continued)

*Primary Examiner* — Farley Abad (57) ABSTRACT

In accordance with a first aspect of the present disclosure, a biometric sensing system is provided, comprising: a sensor module configured to generate sensing data; a processing unit configured to process data received from said sensor module; wherein the sensor module and the processing unit are communicatively coupled to each other via a universal synchronous asynchronous receiver transmitter (USART) communication interface. In accordance with a second aspect of the present disclosure, a corresponding communication method is conceived. In accordance with a third aspect of the present disclosure, a corresponding computer program is provided.

14 Claims, 7 Drawing Sheets

(56) References Cited

U.S. PATENT DOCUMENTS

| | | | | |
|---|---|---|---|---|
| 2014/0222943 | A1* | 8/2014 | Oleson | H04L 69/16 709/208 |
| 2014/0337553 | A1* | 11/2014 | Du | G06F 13/24 710/267 |
| 2016/0037449 | A1* | 2/2016 | Kandhalu Raghu | H04W 52/0209 370/311 |
| 2016/0286524 | A1* | 9/2016 | Griot | H04L 41/00 |
| 2017/0104733 | A1 | 4/2017 | Thanigasalam | |

OTHER PUBLICATIONS

"A Developer's Guide to MIPI I3C Implementation", MIPI DevCon, 1 pg., retrieved from the interent Sep. 11, 2017 at: https://www.youtube.com/watch?v=cL1rhfqHj88 (Feb. 17, 2017).

"Whiteboard Wednesdays—Advantages of the MIPI I3C Interface", Cadence Design Systems, 1 pg., retrieved from the internet Sep. 11, 2017 at: https://www.youtube.com/watch?v=K8LjIEC3UEo (Jun. 1, 2016).

"I2C", Wikipedia, 14 pgs., retrieved from the internet Sep. 11, 2017 at: https://en.wikipedia.org/w/index.php?title=I2C&oldid=785951469, (Jun. 16, 2017).

Extended European Search Report for Patent Appln. No. 17183469.0 (dated Sep. 20, 2017).

\* cited by examiner

BIOMETRIC SENSING SYSTEM AND COMMUNICATION METHOD

CROSS-REFERENCE TO RELATED APPLICATIONS

This application claims the priority under 35 U.S.C. § 119 of European patent application no. 17183469.0, filed on Jul. 27, 2017, the contents of which are incorporated by reference herein.

OVERVIEW

The present disclosure relates to a biometric sensing system. Furthermore, the present disclosure relates to a corresponding method of communicating between a sensor module and a processing unit in a biometric sensing system, and to a corresponding computer program. Electronic devices such as smart cards are widely used in society. For example, smart cards may be used as electronic identity (eID) cards and payment cards (e.g., bank cards). Although these cards are relatively secure due to their cryptographic capabilities, they are usually not equipped with a user interface suitable for entering user credentials, i.e. a so-called "authentication interface". As a consequence, most card users still enter their PIN code through personal computers and laptops, which increases the risk that their credentials are intercepted by malicious software such as Trojans and key-logger programs. Some smart cards have been equipped with embedded biometric sensing systems, including a sensor module. An example of such a sensor module is a fingerprint sensor. However, it may be challenging to implement a simple, high-bandwidth interface between such a sensor module and processing components of the card (e.g., a microcontroller). The same challenge may exist for biometric sensing systems that are embedded in other types of electronic devices, such as Internet-of-Things (IoT) devices and wearable devices.

SUMMARY

In accordance with a first aspect of the present disclosure, a biometric sensing system is provided, comprising: a sensor module configured to generate sensing data; a processing unit configured to process data received from said sensor module; wherein the sensor module and the processing unit are communicatively coupled to each other via a universal synchronous asynchronous receiver transmitter (USART) communication interface.

In an embodiment, the sensor module and the processing unit are configured to communicate with each other in a half-duplex mode of communication.

In an embodiment, the processing unit is configured to operate in a master mode and the sensor module is configured to operate in a slave mode.

In an embodiment, the processing unit is configured to provide a clock signal to the sensor module.

In an embodiment, the USART communication interface comprises a clock line and a data line.

In an embodiment, the processing unit is configured to assert a signal on the clock line and the sensor module is configured to wake up in response to receiving said signal on the clock line.

In an embodiment, the sensor module is configured to signal an interrupt request to the processing unit by pulling the data line low.

In an embodiment, the processing unit is configured to transmit a reset instruction to the sensor module by pulling the clock line low for a predefined amount of time.

In an embodiment, the processing unit is a microcontroller.

In an embodiment, the processing unit and the sensor module are configured to operate in a sleep mode.

In an embodiment, the processing unit is configured to determine a message length in dependence on the data received from the sensor module.

In an embodiment, a smart card, an internet-of-things device or a wearable device comprises a system of the kind set forth.

In accordance with a second aspect of the present disclosure, a method of communicating between a sensor module and a processing unit in a biometric sensing system is conceived, wherein the sensor module generates sensing data and the processing unit processes data received from said sensor module, and wherein sensor module and the processing unit communicate with each other via a universal synchronous asynchronous receiver transmitter (USART) communication interface.

In an embodiment, the sensor module and the processing unit communicate with each other in a half-duplex mode of communication.

In accordance with a third aspect of the present disclosure, a computer program is provided, comprising non-transient executable instructions that, when executed by a sensor module or a processing unit, cause said sensor module and processing unit to carry out a method of the kind set forth.

DESCRIPTION OF DRAWINGS

Embodiments will be described in more detail with reference to the appended drawings, in which.

DESCRIPTION OF EMBODIMENTS

Figure 1:
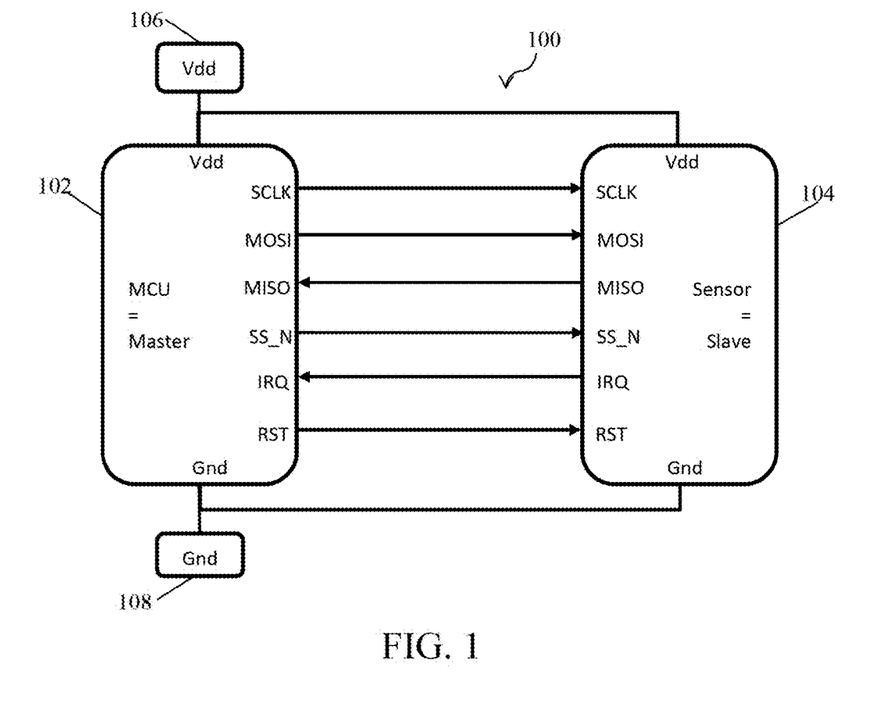
FIG. 1 shows an example of a biometric sensing system.

FIG. 1 shows an example of a biometric sensing system 100. The sensing system 100 comprises a microcontroller 102 that acts as a master device. The microcontroller 102 is an example of a processing unit of the kind set forth. Furthermore, the sensing system 100 comprises a sensor module 104, e.g. a fingerprint sensor, which acts a slave device. Furthermore, both the microcontroller 102 and the sensor module 104 are connected to a supply voltage 106 and to ground 108. The microcontroller 102 and the sensor module 104 are configured to communicate with each other via a serial peripheral interface (SPI). An SPI often comprises at least six communication lines: a serial clock (SCLK) line, a master-output-slave-input (MOSI) line, a master-input-slave-output (MISO) line, a slave select (SS_N) line, an interrupt request (IRQ) line, and a reset (RST) line. A SPI is relatively fast, for example compared to an I²C interface, and it provides full-duplex communication. However, as shown in FIG. 1, a relatively large amount of communication lines or wires is required. It may be difficult to implement such a large amount of wires in some devices. For example, low-cost manufacturing of smart cards utilizes wire-embedding technology to create interconnections between embedded components. Since wire-embedding is a serial manufacturing process the number of interconnections between embedded components has a major impact on the throughput time during the wire-embedding manufacturing step. For that reason, it is desirable to reduce the number of interconnections between the components of a smart card. Similar challenges may exist for other types of devices, e.g. IoT devices and wearable devices.

Therefore, in accordance with the present disclosure, a biometric sensing system is provided, comprising a sensor module configured to generate sensing data and a processing unit configured to process data received from said sensor module. Furthermore, the sensor module and the processing unit are communicatively coupled to each other via a universal synchronous asynchronous receiver transmitter (USART) communication interface. In this way, less communication lines are required between the sensor module and the processing unit, while the communication between them can still be performed at an acceptable speed. In particular, the USART communication interface provides a high bandwidth.

Furthermore, in an embodiment, the sensor module and the processing unit are configured to communicate with each other in a half-duplex mode of communication. In this way, less communication lines are required between the sensor module and the processing unit, while the communication between them can still be performed at an acceptable speed and power consumption. More specifically, if one device is a sensor module that provides bulk data (e.g., fingerprint image data) to a processing unit, then a high bandwidth will be required for sending data from the sensor module to the processing unit, while a low bandwidth will be required for the transmission of data in the other direction. That is to say, the processing unit merely needs to transmit setup- and control-information to the sensor module. The SPI has been developed to provide high bandwidth in both directions, providing full-duplex communication. In a biometric sensing system of the kind set forth, it may be sufficient to provide a high bandwidth only in one direction, i.e. from the sensor module to the processing unit. Thus, the sensor module and the processing unit may communicate with each other in a half-duplex mode of communication via a USART interface.

The fingerprint sensing system may be used to advantage in a smart card, or in any other device in which creating sufficient communication lines presents a challenge (e.g., IoT devices or wearable devices). It is noted that the biometric sensing system may be a fingerprint sensing system. However, the sensing system may also be another type of biometric sensing system. For instance, the presently disclosed system and method may be used to advantage in high-bandwidth streaming devices equipped with a face recognition camera, an iris scan camera or a vein pattern camera. In those cases, the camera embodies a sensor module of the kind set forth.

Figure 2:
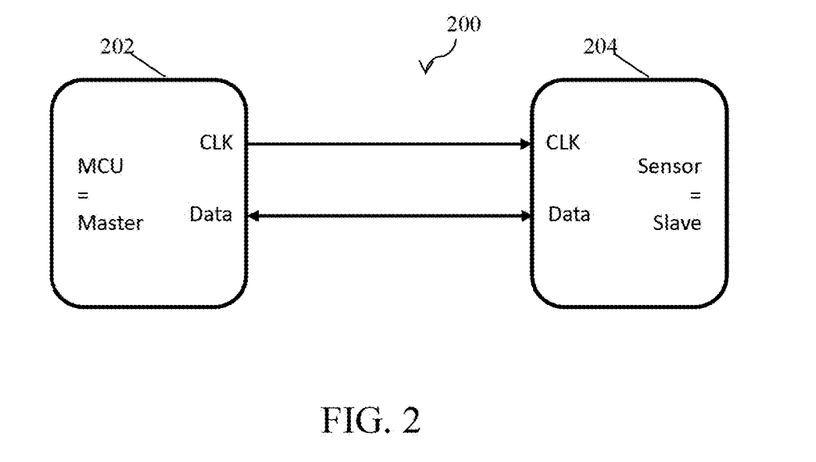
FIG. 2 shows an illustrative embodiment of a biometric sensing system.

FIG. 2 shows an illustrative embodiment of a biometric sensing system 200. The sensing system 200 comprises a microcontroller 202 that is communicatively coupled to a sensor module 204 via a USART interface. In a practical and efficient implementation, the USART interface comprises a clock (CLK) line and a data (Data) line. In an embodiment, the processing unit is configured to operate in a master mode and the sensor module is configured to operate in a slave mode. In this way, the communication may be performed efficiently. In this example, the processing unit is the microcontroller 202. It is noted that the processing unit is not necessarily a microcontroller; other types of processing units may also be used. In an embodiment, the processing unit (e.g., the microcontroller 202) is configured to provide a clock signal to the sensor module 204, which results in a practical and efficient implementation.

Figure 3:
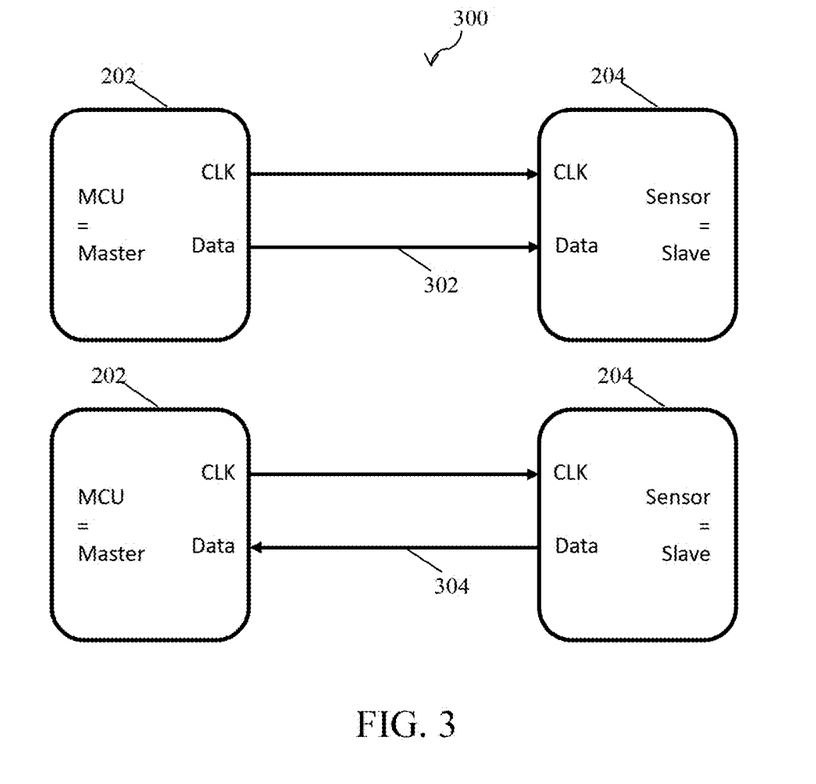
FIG. 3 shows another illustrative embodiment of a biometric sensing system.

FIG. 3 shows another illustrative embodiment of a biometric sensing system 300. The sensing system 300 comprises a microcontroller 202 that is communicatively coupled to a sensor module 204 via a USART interface. In a practical and efficient implementation, the USART interface comprises a clock (CLK) line and a data (Data) line. As mentioned above, the sensor module and the processing unit may be configured to communicate with each other in a half-duplex mode of communication. In accordance with the principles of half-duplex communication, data may be transmitted through the interface in two directions, but not simultaneously. In this example, data may be transmitted on the data line in a first direction 302 (i.e., from the microcontroller 202 to the sensor module 204), and in a second direction 304 (i.e., from the sensor module 304 to the microcontroller 202). Specifically, as will be explained in more detail with reference to FIG. 5, FIG. 6 and FIG. 7, flow control may be added to the USART interface in order to implement the half-duplex mode of communication. By adding such a flow control, the USART interface may be customized. Specifically, the data line may not only be used for the transmission of data (e.g., sensing data), but also for transmitting interrupt requests. Furthermore, the clock line may not only be used for the transmission of a clock signal, but also for transmitting reset instructions. The added flow control may be implemented as a protocol layer in hardware and/or software, and may be compatible with standard microcontrollers.

Figure 4:
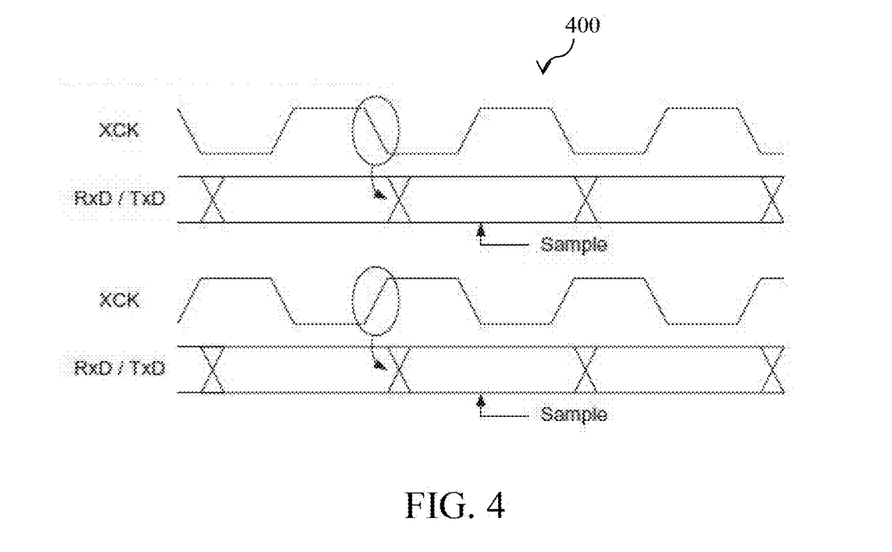
FIG. 4 shows a timing diagram of a USART interface.

FIG. 4 shows a timing diagram 400 of a USART interface. The clock signal is provided by the master device. In accordance with the present disclosure, the processing unit acts as the master device. Therefore, the processing unit is configured to provide a clock signal to the sensor module.

Figure 5:
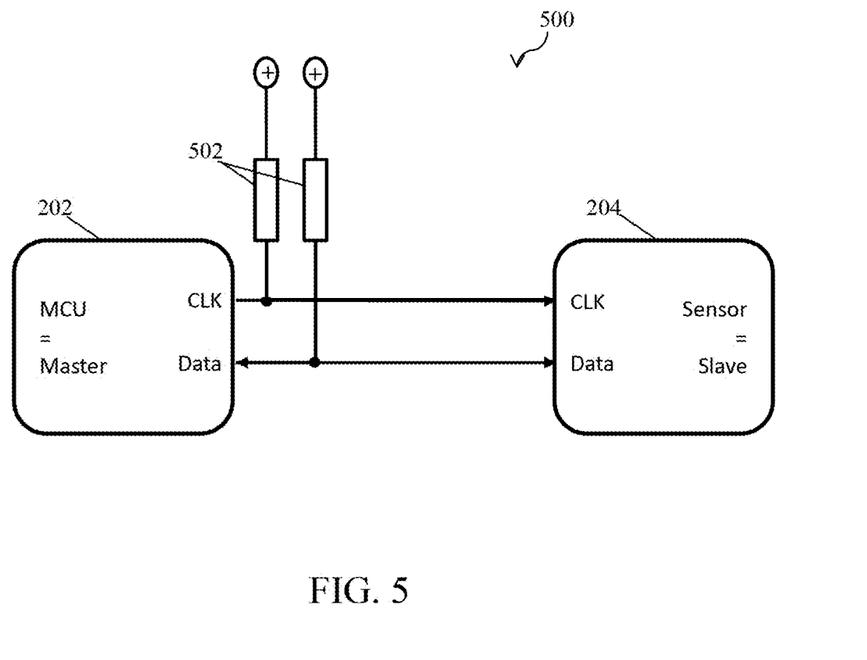
FIG. 5 shows a further illustrative embodiment of a biometric sensing system.

FIG. 5 shows a further illustrative embodiment of a biometric sensing system 500. Again, the sensing system 500 comprises a microcontroller 202 and a sensor module 204 that are communicatively coupled to each other via a USART interface. The USART interface comprises a clock (CLK) line and a data (Data) line. In operation, a device (i.e. the microcontroller 202 or the sensor module 204) that may need to communicate data may request the other side to wake up for reception. For this purpose, different mechanisms may be provided for master and slave. In a practical and efficient implementation, the slave (i.e., the sensor module 204) may signal an interrupt request to the microcontroller 202 by pulling the data line low. In this way, a separate line for transmitting an interrupt request is not needed. The data line may by default be pulled up using a resistor 502, while no communication is in progress. Furthermore, in a practical and efficient implementation, the master (i.e., the microcontroller 202) may simply assert a signal on the clock line to wake up the slave (i.e., the sensor module 204) and request communication. In this way, a separate line for transmitting a wake-up signal is not needed.

For example, the following operations may be performed. If the slave 204 causes the interrupt request (IRQ, always from active state):
  the microcontroller 202 de-activates the data line pull-up;
  the microcontroller 202 de-activates the clock line pull-up;
  the microcontroller 202 wakes up;
  the microcontroller 202 activates clock;
  the microcontroller 202 receives data;
  the microcontroller 202 re-activates the data line pull-up;
  the microcontroller 202 re-activates the clock line pull-up;
  the microcontroller 202 enters a pre-defined sleep mode.
    If the microcontroller 202 causes the communication request (slave wake-up, always from active state):
  the microcontroller 202 asserts a clock signal;
  the slave 204 wakes up;
  the microcontroller 202 waits for the slave 204 to wake up;
  the microcontroller 202 transmits data;
  the slave 204 receives data until clock is de-asserted;
  the microcontroller 202 de-asserts the clock;
  the slave 204 turns into a pre-defined sleep mode.

In an embodiment, the processing unit is configured to transmit a reset instruction to the sensor module by pulling the clock line low for a predefined amount of time. In this way, a separate line for transmitting a reset instruction is not needed. For example, the following operations may be performed in order to reset the sensor module 204:
  the microcontroller 202 requests a sensor reset (from the active state);
  the microcontroller 202 asserts LOW on the clock line;
  the microcontroller 202 resets if clock=LOW for a pre-defined amount of time;
  the slave 204 turns into a predefined sleep mode after its reset process.

Figure 6:
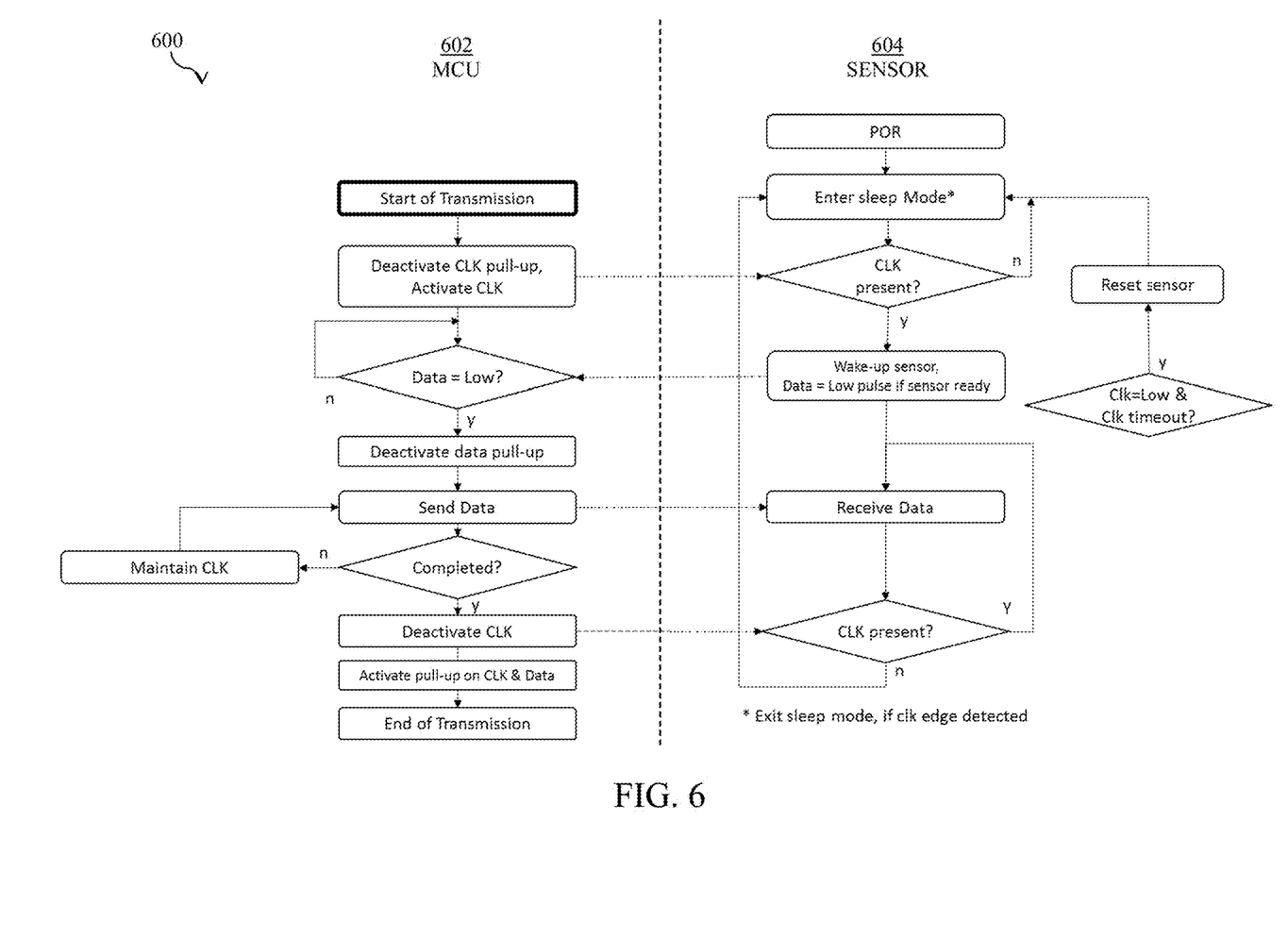
FIG. 6 shows an illustrative embodiment of a communication flow.

FIG. 6 shows an illustrative embodiment of a communication flow 600. In particular, it shows an example implementation of a communication flow 600 between the microcontroller 602 and the sensor module 604. It is noted that the sensor 604 may be set automatically in a power-down mode, if it is not active. Furthermore, there may be no need for the microcontroller to perform power management of the sensor. It is also noted that the microcontroller 602 may be the communication master. Furthermore, the idle state of CLK and Data may be high (using internal microcontroller pull-ups). In this example, if the microcontroller 602 sets the CLK signal to low for a predefined amount of time, the sensor will be reset.

Figure 7:
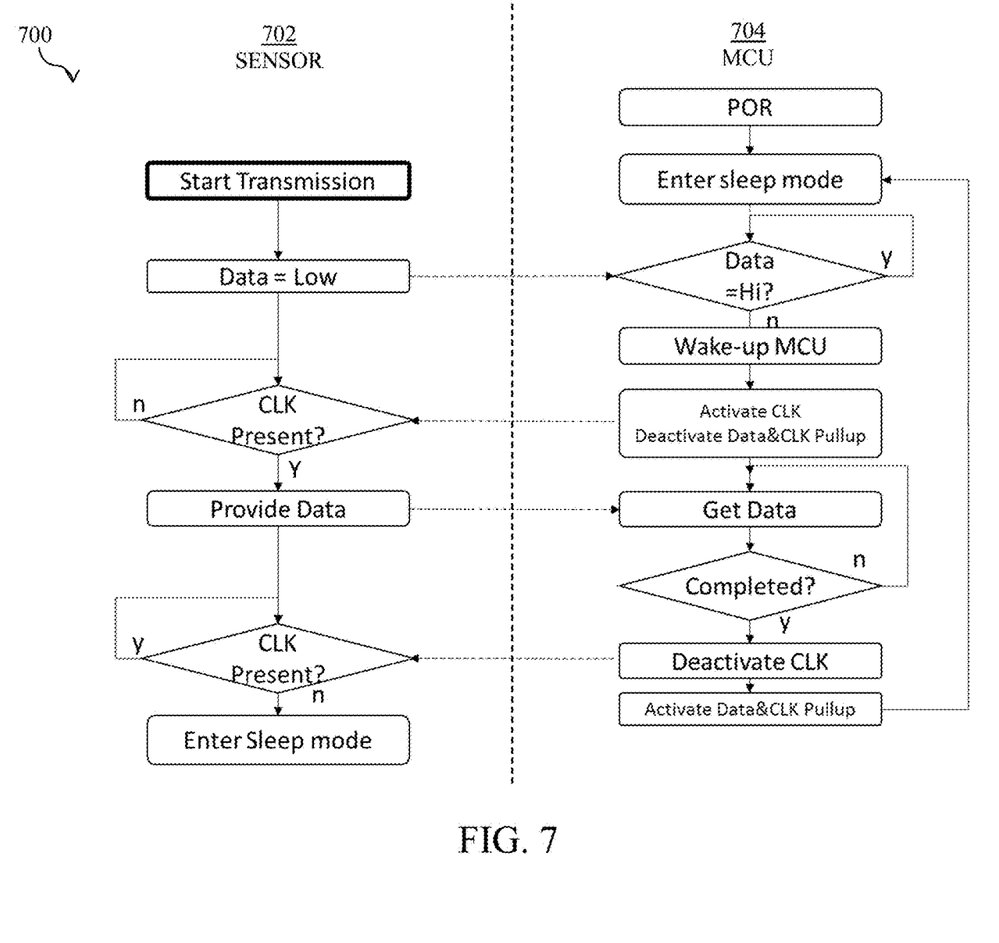
FIG. 7 shows another illustrative embodiment of a communication flow.

FIG. 7 shows another illustrative embodiment of a communication flow 700. In particular, it shows another example implementation of a communication flow 700 between the sensor module 702 and the microcontroller 704. It is noted that if the sensor 702 wants to send data to the microcontroller 704, it may set the data line to low as long as there is no CLK signal from the microcontroller 704. This communication protocol may support power management, where both devices may be most of the time in a pre-defined sleep mode, until they need to communicate. Thus, in an embodiment, the processing unit and the sensor module are configured to operate in a sleep mode, which facilitates reducing the power consumption.

In a practical and efficient implementation, the processing unit is configured to determine a message length in dependence on the data received from the sensor module. More specifically, the processing unit (i.e., master) may calculate a communication message length using information received from the sensor module (i.e., the slave). Thus, the processing unit may track the length of the already received message and acknowledge receipt of the message if the length of the received message equals the expected message length. In this way, the receipt of a message can be acknowledged in an efficient manner.

Figure 8:
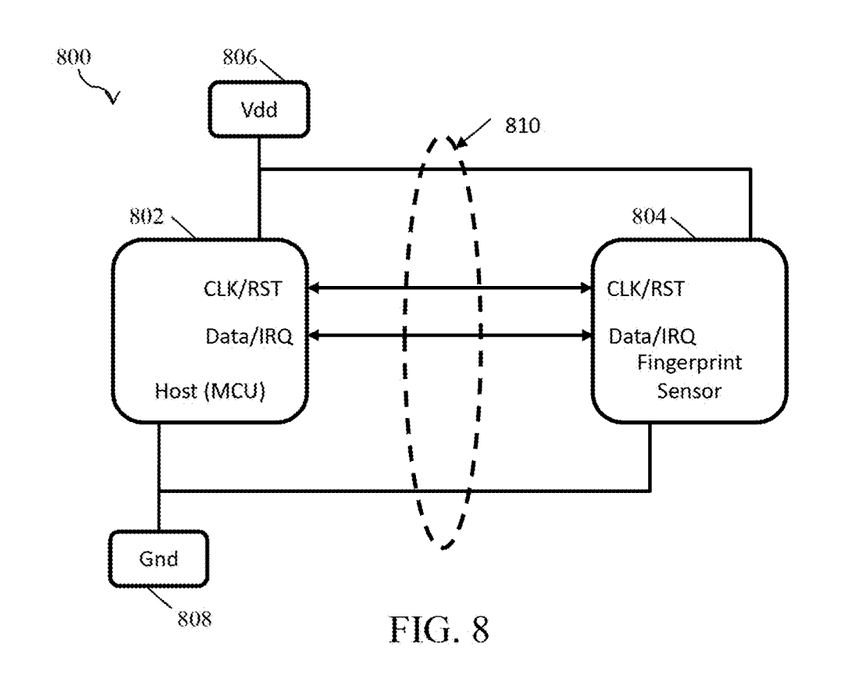
FIG. 8 shows a further illustrative embodiment of a biometric sensing system.

FIG. 8 shows a further illustrative embodiment of a biometric sensing system 800. The sensing system 800 comprises a microcontroller 802 communicatively coupled to a fingerprint sensor 804. Both the microcontroller 802 and the fingerprint sensor 804 are connected to a supply voltage 806 and to ground 808. In accordance with the present disclosure, the microcontroller 802 and the fingerprint sensor 804 are configured to communicate with each other via a USART interface, using only a clock line and a data line. Thus, the sensing system 800 may in total require only four interconnections 810: a clock line, a data line, and two power lines (Vdd, Gnd). Thus, the number of interconnections between the microcontroller and the fingerprint sensor is significantly reduced.

Figure 9:
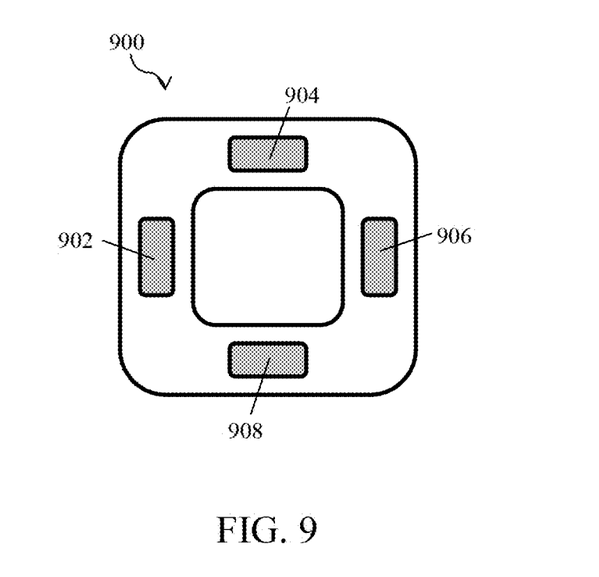
FIG. 9 shows an illustrative embodiment of a sensor module.

FIG. 9 shows an illustrative embodiment of a sensor module 900. As mentioned above, the sensing system may in total require only four interconnections. As a result, only four contact pads 902, 904, 906, 908 may be needed to connect the sensor module 900 to the interconnection wires. Furthermore, said contact pads 902, 904, 906, 908 may be implemented at substantially the center of the four sides of the sensor module 900, instead of implementing them at the corners of said module. In this way, the sensor module 900 may better withstand mechanical stress caused by, for example, bending and/or torsion. This is, in turn, particularly useful in a smart card.

Figure 10:
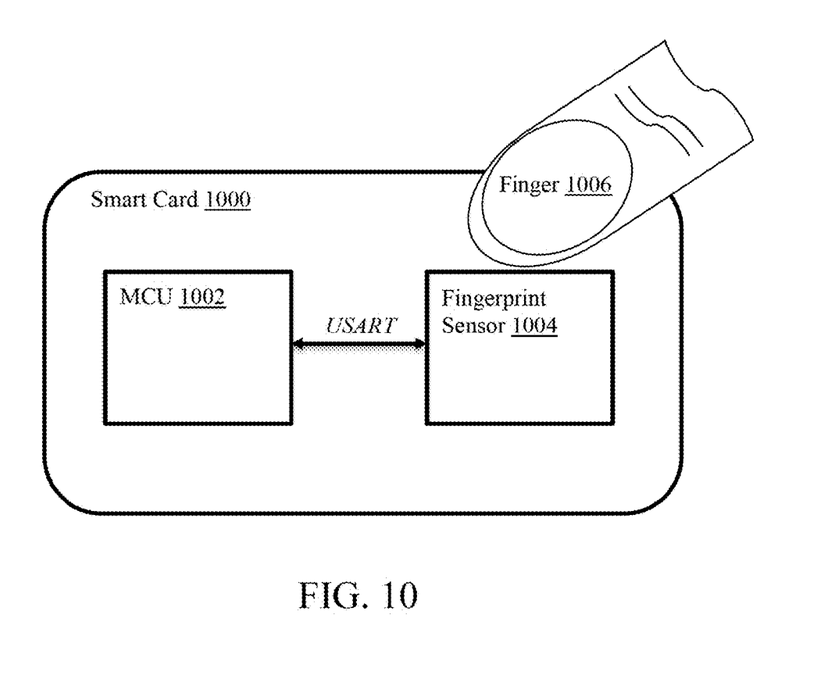
FIG. 10 shows an illustrative embodiment of a smart card.

FIG. 10 shows an illustrative embodiment of a smart card 1000. The smart card comprises a microcontroller 1002 communicatively coupled to a fingerprint sensor 1004 via a USART communication interface. In this way, less communication lines are required between the fingerprint sensor 1004 and the microcontroller 1002, while the communication between them can still be performed at an acceptable speed. In particular, the USART communication interface provides a high bandwidth. In operation, a finger 1006 may touch the fingerprint sensor 1004, and the fingerprint sensor 1004 may transmit fingerprint image data to the microcontroller 1002 using the USART communication interface.

The presently disclosed system and method may at least partly be executed by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form. The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 sensing system
102 microcontroller
104 sensor module
106 supply voltage
108 ground
200 sensing system
202 microcontroller
204 sensor module
300 sensing system
302 first direction
304 second direction
400 timing diagram
500 sensing system
502 resistors
600 communication flow
602 microcontroller side
604 sensor side
700 communication flow
702 sensor side
704 microcontroller side
800 sensing system
802 microcontroller
804 fingerprint sensor
806 supply voltage
808 ground
810 interconnections
900 sensor module
902 contact pad
904 contact pad
906 contact pad
908 contact pad
1000 smart card
1002 microcontroller
1004 fingerprint sensor
1006 finger

The invention claimed is:

1. A biometric sensing system comprising:
a sensor module configured to generate sensing data;
a processing unit configured to process data received from said sensor module;
wherein the sensor module and the processing unit are communicatively coupled to each other via a universal synchronous asynchronous receiver transmitter, USART, communication interface, wherein the USART communication interface comprises only a clock line and a data line and wherein the clock line of the USART communication interface is directly connected to the sensor module and to the processing unit and wherein the data line of the USART communication interface is directly connected to the sensor module and to the processing unit.

2. The system of claim 1, wherein the sensor module and the processing unit are configured to communicate with each other in a half-duplex mode of communication.

3. The system of claim 1, wherein the processing unit is configured to operate in a master mode and the sensor module is configured to operate in a slave mode.

4. The system of claim 1, wherein the processing unit is configured to provide a clock signal to the sensor module.

5. The system of claim 1, wherein the processing unit is configured to assert a signal on the clock line and wherein the sensor module is configured to wake up in response to receiving said signal on the clock line.

6. The system of claim 1, wherein the sensor module is configured to signal an interrupt request to the processing unit by pulling the data line low.

7. The system of claim 1, wherein the processing unit is configured to transmit a reset instruction to the sensor module by pulling the clock line low for a predefined amount of time.

8. The system of claim 1, wherein the processing unit is a microcontroller.

9. The system of claim 1, wherein the processing unit and the sensor module are configured to operate in a sleep mode.

10. The system of claim 1, wherein the processing unit is configured to determine a message length in dependence on the data received from the sensor module.

11. A smart card, an internet-of-things device or a wearable device comprising the system of claim 1.

12. A method of communicating between a sensor module and a processing unit in a biometric sensing system, wherein the sensor module generates sensing data and the processing unit processes data received from said sensor module, and wherein sensor module and the processing unit communicate with each other via a universal synchronous asynchronous receiver transmitter, USART, communication interface, wherein the USART communication interface comprises only a clock line and a data line and wherein the clock line of the USART communication interface is directly connected to the sensor module and to the processing unit and wherein the data line of the USART communication interface is directly connected to the sensor module and to the processing unit.

13. The method of claim 12, wherein the sensor module and the processing unit communicate with each other in a half-duplex mode of communication.

14. A computer program product comprising a non-transitory computer readable medium that stores executable instructions that, when executed by a sensor module or a processing unit, cause said sensor module and processing unit to carry out the method of claim 12.

\* \* \* \* \*